Figure 1:
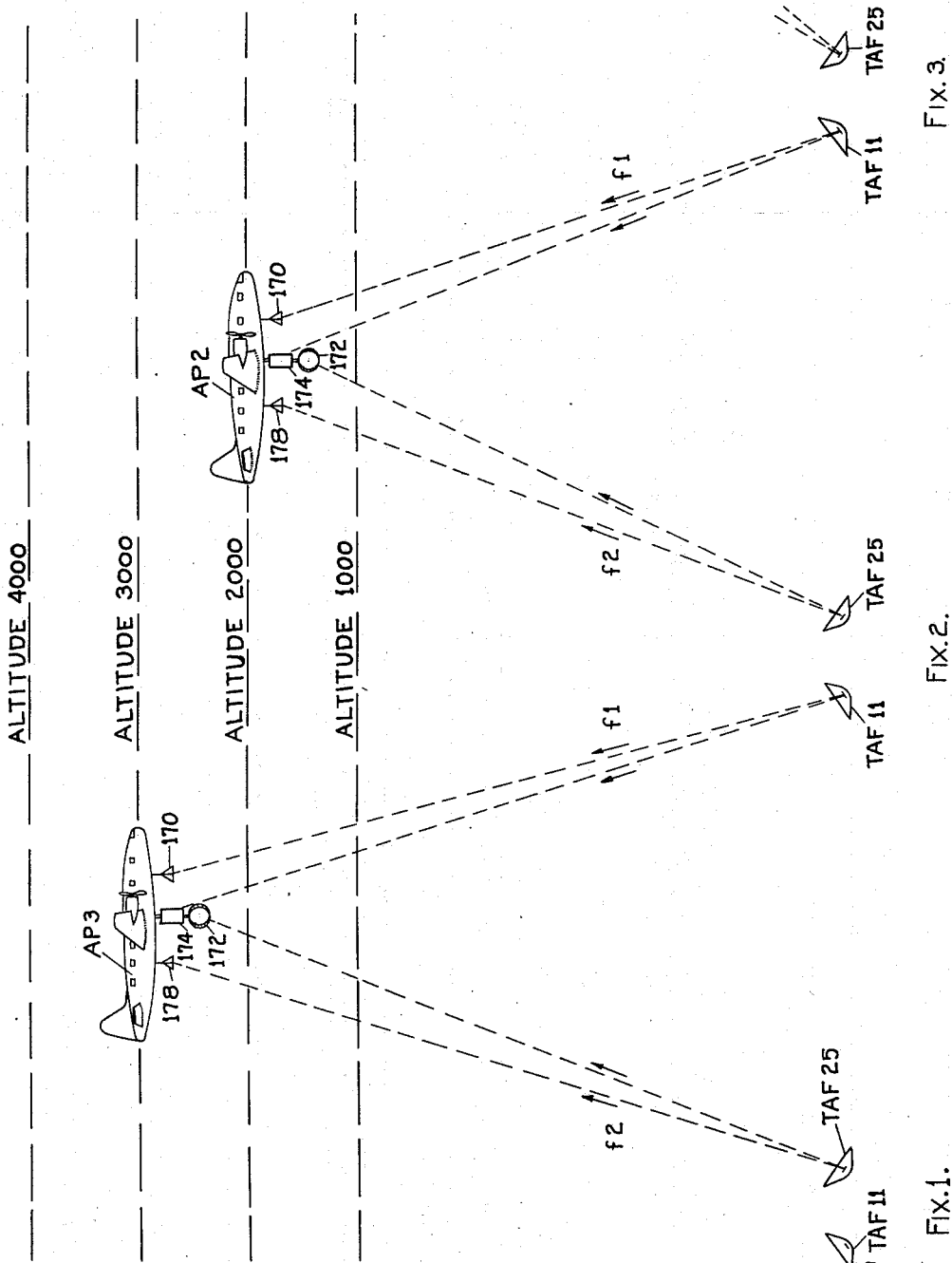

Patented May 12, 1953

2,638,590

UNITED STATES PATENT OFFICE 2,638,590

STRAIGHT COURSE LOCATOR FOR AIRPLANES

Oscar S. Field, Rochester, N. Y., assignor to General Railway Signal Company, Rochester, N. Y.

Original application August 30, 1945, Serial No. 613,600, now Patent No. 2,509,632, dated May 30, 1950. Divided and this application October 27, 1949, Serial No. 123,845

2 Claims. (Cl. 343—112)

1

This invention relates to course finding systems for airplanes, and more particularly pertains to the provision of a straight course indicator for use in connection with determining the course of an airplane between a series of successively spaced radio ground stations.

This application is a division of my prior application, Ser. No. 613,600, filed August 30, 1945, which has resulted in Pat. No. 2,509,632, dated May 30, 1950, relating to a block signal system for airplanes; and no claim is intended to be made in this application to such a block signalling system, it being understood that the present invention as disclosed and claimed herein relates to a course locating system which may at times be employed with such a block signalling system and at other times may be used alone.

It has been proposed in the above mentioned parent case to divide a traffic route into block sections having a plurality of altitude routes over such traffic route. On the ground along such traffic route are located suitable radio block stations adapted to cooperate with signalling apparatus on the airplanes so that the proper traffic condition is displayed in the cab of each airplane as it flies along the traffic route through the successive blocks at any one of the assigned altitudes. Although such a system may give the desired traffic information to the airplanes as they fly over the route, it is also necessary that each airplane be able to determine that it is flying along the proper course outlined by the block stations. It is of course understood that conventional altimeters may be used to determine that the airplane is travelling at the proper altitude. Also, it will be appreciated that automatic direction finding apparatus has the disadvantage, however, that side winds cause the airplane to drift so that it actually fails to follow a straight course between successive block stations.

In view of the above considerations, it is proposed in accordance with the present invention to provide suitable means to cooperate with the successive ground radio stations so as to manifest on an airplane whether or not it is flying directly over a straight route connecting any pair of such successive ground stations.

It is also an object of the present invention to provide such a system that it may cooperate with radio ground stations used merely for delineating a course, or may also cooperate with ground stations used in connection with a block signalling system such as disclosed in the above mentioned parent application.

Other objects, purposes, and characteristic features of the present invention will in part be described hereinafter and will in part be understood from the accompanying drawings, in which—

Figure 2:
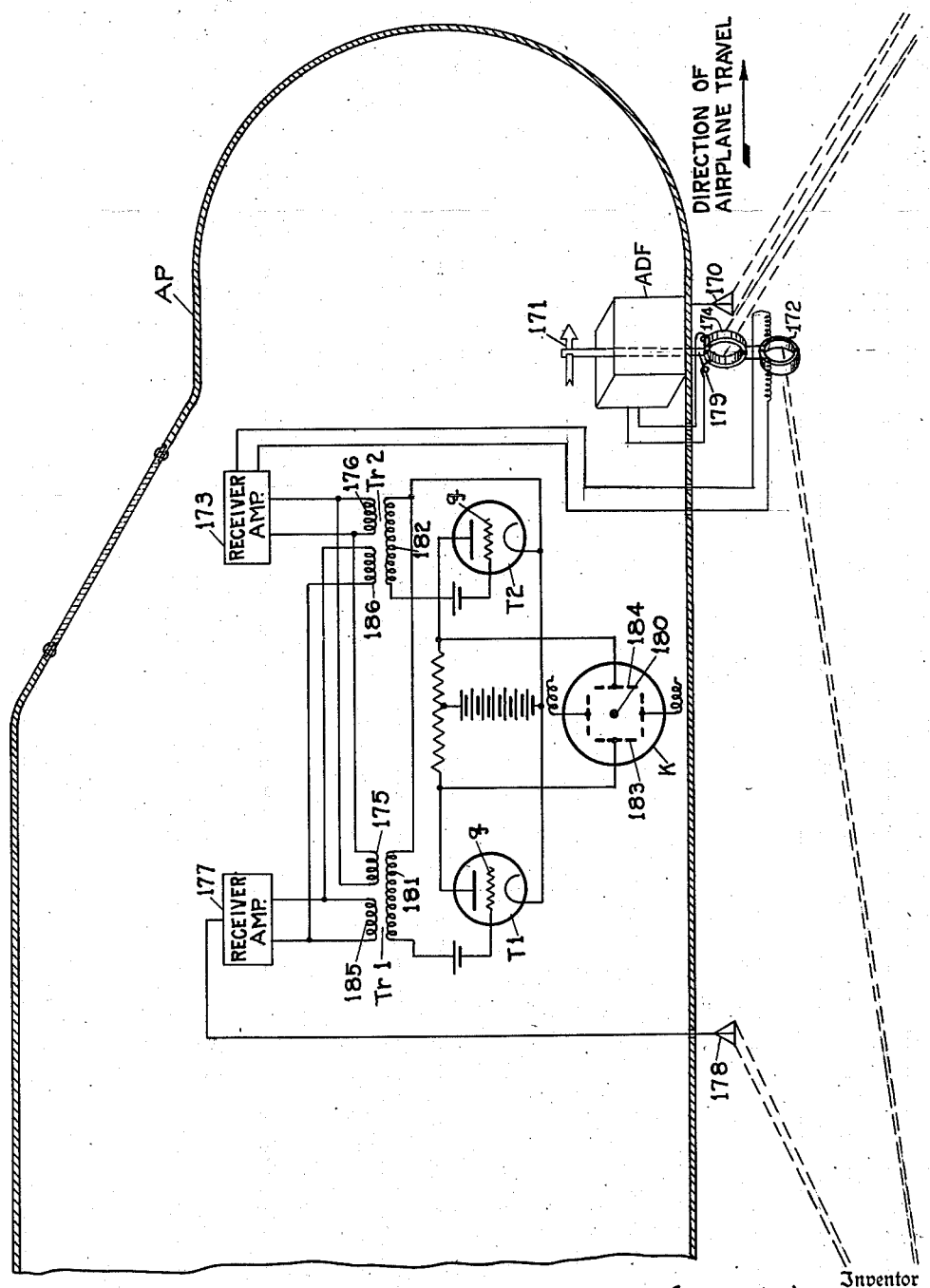

Fig. 1 is a diagrammatic view of a succession of block stations with which the apparatus of the present invention may cooperate in locating the route for an airplane; and Fig. 2 illustrates the apparatus employed in a system provided by the present invention for indicating to the pilot of an airplane a straight route between two successive ground stations irrespective of a substantial tendency of the airplane to drift sideways due to a side wind.

As described in the above mentioned parent application, it is necessary in order to manifest the presence of an airplane precisely within the limits of a particular block of an air traffic route that the beginning and end of such a block section be rather definitely defined. To do this, it is proposed in the parent application to provide at the starting point of each block section a comparatively narrow radio beacon of the fan marker type, such radio beacon being rather wide transversely of the air route but rather narrow longitudinally of the airway. Obviously, the end of such block route is manifested by the reception of radio energy from the fan marker at the beginning of the next block section. In addition, other directional radio transmitting facilities are provided adjacent each fan marker to transmit the traffic conditions in connection with each block. However, insofar as the present invention is concerned the various features of the block system may be ignored since the present invention may be used with or without such a system. All that is necessary in connection with the present invention is that the successive block stations be distinctively identifiable.

More specifically, the ground located apparatus has been diagrammatically illustrated in Fig. 1 as constituting a radio transmitter at the entrance end of each block which radiates space radiation energy forwardly and upwardly toward an airplane flying in that block. Likewise, a ground located radio transmitter is located at the exit end of each block which radiates space radiation energy toward each on-coming airplane in that block. In other words, the airplane carried apparatus (shown in Fig. 2) requires space radiation energy transmitted thereto from the front and from the rear simultaneously but at different carrier frequencies, and Fig. 1 has merely indicated sufficient apparatus to do this. As previously mentioned, this ground apparatus may or may not be a part of a block system.

Fig. 2 illustrates the apparatus in the cab of an airplane AP for indicating whether or not that airplane is flying directly over the route and if not to what extent it is deviating from such route. This route flying apparatus of Fig. 2 is, of course, contemplated as being used in connection with the ground located transmitters illustrated in Fig. 1, and also shown and described in detail in the prior parent application.

Referring now to Fig. 2, the airplane carried apparatus includes the usual and well known automatic direction finding equipment ADF. This instrument is provided with a directional antenna 174 and a sense antenna 170 and this instrument also includes a pointer 171 which is operated by its vertical shaft 179 and which will point to the radio ground station that emits carrier frequency to which both the directional antenna 174 and the sense antenna 170 of this instrument ADF are tuned. The exact construction of this automatic direction finding instrument is deemed unnecessary because it is well known in the art and for further description thereof attention is directed to pages 207-219, of Aviation Radio, by Henry W. Roberts, 1945.

In accordance with the invention illustrated in Fig. 2, this automatic direction finding instrument has physically mounted upon the indicator shaft 179 thereof a directional antenna 172. This directional antenna has its output wires connected to an amplifier 173 which has its output leads connected to the primary windings 175 and 176 of the transformers Tr1 and Tr2, respectively. This directional antenna 172 is tuned to the same frequency as is emitted by a ground located radio transmitter located at the entrance end of the block under consideration, namely, to the rear of the airplane. This airplane carrier apparatus also includes a second receiver-amplifier 177 which is fed by energy from a sense antenna 178. This receiver-amplifier 177 is also tuned to the same carrier frequency as is the directional antenna 172. The sense antenna 178 is, however, omni-directional whereas the antenna 172 is highly directional. The output leads from the receiver-amplifier 177 are connected to the primary windings 185 and 186 of the transformers Tr1 and Tr2, respectively.

It should be observed that the primary windings 185 and 186 are connected to the output leads of the receiver-amplifier 177 in like fashion; whereas, the windings 175 and 176 of these same transformers are connected to the output leads of the receiver-amplifier 173 in unlike fashion. From this construction, it is readily seen that under those conditions where the windings 175 and 185 are energized accumulatively from the ground station in the rear, this same ground station will cause energy to flow in the windings 176 and 186 in bucking relationship, and vice versa. When the airplane under consideration is flying precisely over the route the directional antenna 172, which is preferably of the circular coil type, is disposed in a plane such that zero energy is induced therein from the ground located radio transmitter to the rear of the airplane. Under this same circumstance energy will be received by the omni-directional antenna 178 so that the receiver-amplifier 177 delivers energy through its output circuit to the primary windings 185 and 186 of transformers Tr1 and Tr2, respectively.

In other words, energy of the same value (zero energy being induced by primary windings 175 and 176) is induced in the secondary windings 181 and 182 of the transformers Tr1 and Tr2, respectively. With like potentials applied to the grids g of the amplifying tubes T1 and T2 like potentials will also result on the deflecting plates 183 and 184 of the cathode ray viewing tube or cathode ray scope K. With like potentials applied on the two deflecting plates 183 and 184 the lighted spot 180 on the cathode ray screen will assume the center position as illustrated in Fig. 2.

If now, on the other hand, the airplane should veer to the left of the route the directional antenna 172 would no longer receive zero energy from the ground located station in the rear so that it would at least to a slight extent render the receiver-amplifier 173 active. This would cause the primary windings 175 and 176 of the transformers Tr1 and Tr2 to be lightly energized and this energy would in the case of the transformer Tr1 subtract from the excitation supplied by the windings 185 so that the output from the transformer Tr1 would become less; whereas, the output for the transformer Tr2 would become greater than it was before, due to the fact that the energies applied to the windings 176 and 186 of this transformer Tr2 are accumulative. With the amplifying tube T2 passing more current than the amplifier T1 the deflecting plate 184 will become less positive than the deflecting plate 183, as a result of which the electron beam in this cathode ray scope K will be bent toward the left so that the spot 180 will be located slightly to the left of the location illustrated in the drawing. Should, however, the airplane veer to the right off of the route over which it is to fly, the phase of the current induced in the directional antenna 172 will be shifted 180° as a result of which the energies applied to the windings 175 and 185 of the transformer Tr1 will become accumulative and the energies applied to the windings 176 and 186 of the transformer Tr2 will become subtractive as a result of which the tube T1 will draw more current than will tube T2, the deflecting plate 183 will therefore become less positive than the deflecting plate 184 and the spot 180 on the screen of the cathode ray scope K will be shifted to the right. In other words, the cathode ray scope K will, by the location of its lighted spot 180 on the screen thereof, inform the pilot whether he is flying to the left or to the right of the route over which he is to fly.

With reference to Fig. 1, two airplanes AP2 and AP3, are shown, each being equipped with the apparatus of Fig. 2 and respectively flying at altitudes 2000 and 3000. Along the traffic route are located the successive ground stations, such as Fix 1, Fix 2, Fix 3, and so forth. Each such ground station is equipped with directional radio transmitters TAF11 and TAF25. The transmitter TAF11 radiates a distinctive frequency $f1$ as compared to the frequency $f2$ radiated by the transmitter TAF 25.

These directional antennas are supplied with radio frequency signals in any conventional way so as to radiate continuously radio signals to which the airplane apparatus may respond. Obviously, such transmitters may be used without any connection to a block signalling system, or may be used with suitable controls imposed thereon as described in the above identified parent application.

Having thus described a straight course indicating system as one specific embodiment of the present invention, it is desired to be understood that this form is selected to facilitate in the disclosure of the invention rather than to limit the number of forms which it may assume; and it is to be further understood that various modifications, adaptations, and alternations may be applied to the specific form shown to meet the requirements of practice, without in any manner departing from the spirit or scope of the present invention.

What I claim is:

1. An airplane route delineating system having airplane route indicating apparatus comprising in combination, an automatic direction finder having a shaft with a first directional antenna rotated thereby effective when tuned to the frequency of a ground station in advance of the airplane to always maintain the shaft rotated so as to direct said antenna toward said station in advance, a second directional antenna rotated by said shaft and directed at right angles to said first directing antenna so as to receive minimum radiated energy from a station in the rear transmitting at a distinctive frequency, said second directional antenna being effective to receive minimum radiated energy only when the line of flight of the airplane coincides with the straight line distance between the advance and rear transmitting stations, radio receiving apparatus on the airplane tuned to the frequency of the station in the rear and associated with said second direction antenna, said radio receiving apparatus having its output variable from maximum to minimum in accordance with the radiated energy received by said second antenna from the station in the rear, other radio receiving means having an omni-directional antenna tuned to the frequency of the station in the rear, a cathode ray tube having oppositely disposed deflecting means for governing the relative position of a beam on the screen of the tube, a transformer for each of said deflecting means of the cathode ray tube, said transformer having two primary windings, circuit means connecting the output of said radio receiving apparatus to one of the primary windings of each of the transformers, said circuit means connecting the primary windings of the two transformers oppositely, circuit means connecting the output of said other receiving means to the other of the primary windings of each of the transformers, said circuit means having the same phase connections for both transformers, and circuit means connecting the outputs of the transformers to their associated deflecting means respectively.

2. An airplane route delineating system having airplane route indicating apparatus comprising in combination, an automatic direction finder having a shaft with a first directional antenna rotated thereby effective when tuned to the frequency of a ground station in advance of the airplane to always maintain the shaft rotated so as to direct said antenna toward said station in advance, a second directional antenna rotated by said shaft and directed at right angles to said first directing antenna so as to receive minimum radiated energy from a station in the rear transmitting at a distinctive frequency only when the line of fight of the air plane coincides with the straight line distance between the advance and rear transmitting stations, radio receiving apparatus on the airplane tuned to the frequency of the station in the rear and associated with said second direction antenna having its output variable from maximum to minimum in accordance with the radiated energy received by said second antenna from the station in the rear, other radio receiving means having an omni-directional antenna tuned to the frequency of the station in the rear, a cathode ray tube having oppositely disposed deflecting means for governing the relative position of a beam on the screen of the tube, and resolving means for combining the outputs of the two receivers in a manner to set up a variable differential voltage in said oppositely disposed deflecting means, the differential voltage being at a minimum only when the output of said first receiver is at a minimum.

OSCAR S. FIELD.

References Cited in the file of this patent

UNITED STATES PATENTS

| Number | Name | Date |
|---|---|---|
| 2,143,178 | Wright | Jan. 10, 1939 |
| 2,252,063 | Cockerell | Aug. 12, 1941 |
| 2,296,041 | Luck | Sept. 15, 1942 |
| 2,364,624 | Dugan | Dec. 12, 1944 |
| 2,379,362 | Lear | June 26, 1945 |
| 2,490,051 | Hardy | Dec. 6, 1949 |